(12) United States Patent
Yamato et al.

(10) Patent No.: US 9,740,434 B2
(45) Date of Patent: Aug. 22, 2017

(54) STORAGE DEVICE AND CONTROL METHOD

(71) Applicant: FUJITSU LIMITED, Kawasaki-shi, Kanagawa (JP)

(72) Inventors: Takaaki Yamato, Nagano (JP); Fumio Matsuo, Nagano (JP); Katsuo Enohara, Kawaguchi (JP); Tetsuya Kinoshita, Nagano (JP); Takashi Murayama, Nagano (JP); Nobuyuki Hirashima, Nagano (JP); Yuki Furukawa, Nagano (JP); Hidetoshi Nishi, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 490 days.

(21) Appl. No.: 14/171,006

(22) Filed: Feb. 3, 2014

(65) Prior Publication Data
US 2014/0309981 A1 Oct. 16, 2014

(30) Foreign Application Priority Data

Apr. 12, 2013 (JP) ................. 2013-084272

(51) Int. Cl.
*G06F 9/455* (2006.01)
*G06F 3/06* (2006.01)

(52) U.S. Cl.
CPC .......... *G06F 3/0664* (2013.01); *G06F 3/0604* (2013.01); *G06F 3/064* (2013.01); *G06F 3/0686* (2013.01)

(58) Field of Classification Search
CPC ...... G06F 3/0664; G06F 3/0604; G06F 3/064; G06F 3/0686

(Continued)

(56) References Cited

U.S. PATENT DOCUMENTS 7,689,759 B2* 3/2010 Bello .................... G06F 3/0617
 711/4
2003/0018878 A1* 1/2003 Dorward .......... G06F 17/30188
 711/216

(Continued)

FOREIGN PATENT DOCUMENTS

JP 2007-323589 12/2007
JP 2008-146408 6/2008

(Continued)

OTHER PUBLICATIONS

Haeusser et al. ("IBM TotalStorage Virtual Tape Server: Planning, Implementing, and Monitoring", International Business Machines Corporation, 2005, pp. 1-532).*

(Continued)

*Primary Examiner* — Omar Fernandez Rivas
*Assistant Examiner* — Iftekhar Khan
(74) *Attorney, Agent, or Firm* — Staas & Halsey LLP

(57) ABSTRACT

A storage device includes a first storage and a processor. The processor is configured to emulate an access to a physical tape with an access to a second storage. The processor is configured to store, in the first storage, first position information in which a first position in a first physical tape is associated with a storage position in the second storage. The processor is configured to receive an instruction to move data stored at the first position in the first physical tape to a second physical tape. The processor is configured to store, in the first storage, second position information in which a second position in the second physical tape is associated with the storage position.

4 Claims, 17 Drawing Sheets

(58) Field of Classification Search
USPC .......................................................... 703/24
See application file for complete search history.

(56) References Cited

U.S. PATENT DOCUMENTS

| | | | | |
|---|---|---|---|---|
| 2005/0010730 A1* | 1/2005 | Kano | .................... | G06F 3/0607 711/161 |
| 2005/0256999 A1* | 11/2005 | Kishi | .................... | G06F 3/0607 711/111 |
| 2008/0077758 A1* | 3/2008 | Ohmido | .............. | G06F 12/0866 711/162 |
| 2008/0140730 A1* | 6/2008 | Toshine | ............ | G06F 17/30221 |
| 2008/0177809 A1* | 7/2008 | Murayama | ............ | G06F 3/0665 |
| 2008/0263274 A1* | 10/2008 | Kishi | .................... | G06F 3/0623 711/114 |
| 2008/0313403 A1* | 12/2008 | Niranjan | .................. | G06F 3/061 711/120 |
| 2009/0043960 A1* | 2/2009 | Toshine | ................ | G06F 3/0613 711/112 |
| 2009/0106493 A1* | 4/2009 | Tsuji | ..................... | G06F 3/0605 711/114 |
| 2009/0228655 A1* | 9/2009 | Yamane | ................ | G06F 3/0611 711/117 |
| 2009/0248977 A1* | 10/2009 | Takatsu | ................. | G06F 3/0625 711/113 |
| 2009/0327599 A1 | 12/2009 | Nonaka et al. | | |
| 2010/0161919 A1* | 6/2010 | Dodgson | ............. | G06F 11/1458 711/161 |
| 2011/0032634 A1* | 2/2011 | Sakamoto | ............. | G06F 3/0611 360/55 |
| 2011/0145494 A1* | 6/2011 | Mitsuma | .................. | G06F 3/061 711/111 |
| 2011/0179222 A1* | 7/2011 | Iwasaki | ................. | G06F 3/0611 711/111 |
| 2011/0185117 A1* | 7/2011 | Beeston | ................ | G06F 12/084 711/111 |
| 2011/0231624 A1* | 9/2011 | Fukutomi | ........... | G06F 12/0246 711/162 |
| 2011/0276753 A1* | 11/2011 | Peake | .................... | G06F 3/0611 711/111 |
| 2011/0276754 A1* | 11/2011 | Bish | ....................... | G06F 3/0611 711/111 |
| 2011/0276756 A1* | 11/2011 | Bish | ....................... | G06F 3/0611 711/112 |
| 2012/0023146 A1* | 1/2012 | Shoji | ..................... | G06F 3/0611 707/827 |
| 2012/0110257 A1 | 5/2012 | Enohara et al. | | |
| 2012/0246425 A1* | 9/2012 | Tanaka | .................. | G06F 3/0611 711/162 |
| 2012/0271993 A1* | 10/2012 | Thompson | ............ | G06F 3/0656 711/111 |
| 2013/0044386 A1* | 2/2013 | Sato | ...................... | G11B 23/042 360/15 |
| 2013/0205082 A1* | 8/2013 | Murayama | .......... | G06F 12/0866 711/111 |
| 2013/0326159 A1* | 12/2013 | Vijayan | ................. | G06F 3/0644 711/148 |
| 2014/0025910 A1* | 1/2014 | Toshine | ................ | G06F 3/0608 711/162 |
| 2014/0036383 A1* | 2/2014 | Cideciyan | .......... | G11B 5/00813 360/55 |
| 2014/0208058 A1* | 7/2014 | Fujisawa | ............... | G06F 3/0604 711/173 |
| 2014/0289485 A1* | 9/2014 | Inai | .......................... | G06F 3/065 711/162 |
| 2014/0380006 A1* | 12/2014 | Maeda | .................. | G06F 3/0683 711/162 |

FOREIGN PATENT DOCUMENTS

| | | |
|---|---|---|
| JP | 2010-33552 | 2/2010 |
| JP | 2012-98965 | 5/2012 |

OTHER PUBLICATIONS

Japanese Office Action dated Dec. 6, 2016 in corresponding Japanese Patent Application No. 2013-084272.

* cited by examiner

FIG. 3

|  | FIRST BLOCK POSITION | 1 | 2 | 3 | 4 | 5 |
|---|---|---|---|---|---|---|
| PV NAME | PV0001 | LV0008 | LV0007 | INVALID | INVALID | LV0006 |
| | PV0002 | INVALID | INVALID | INVALID | LV0005 | FREE |
| | PV0003 | INVALID | INVALID | LV0003 | INVALID | LV0002 |
| | PV0004 | LV0001 | INVALID | LV0004 | FREE | FREE |
| | PV0005 | FREE | FREE | FREE | FREE | FREE |

252a (left column), 252b (right columns), 252 (table)

FIG. 4

| MEDIA NAME (314a) | FIRST BLOCK POSITION (314b) | STORAGE POSITION INFORMATION (314c) | | |
|---|---|---|---|---|
| | | VALID FLAG (314d) | LUN# (314e) | LBA# (314f) |
| PV0001 | 1 | ON | 0 | 0 |
| | 2 | ON | 0 | 100 |
| | 3 | ON | 1 | 100 |
| | 4 | ON | 2 | 400 |
| | 5 | ON | 1 | 300 |
| PV0002 | 1 | ON | 3 | 300 |
| | 2 | ON | 0 | 500 |
| | 3 | ON | 1 | 700 |
| | 4 | ON | 1 | 500 |
| | 5 | OFF | UNDEFINED | UNDEFINED |
| PV0003 | 1 | ON | 2 | 0 |
| | 2 | ON | 0 | 200 |
| | 3 | ON | 0 | 400 |
| | 4 | ON | 3 | 100 |
| | 5 | ON | 3 | 400 |
| PV0004 | 1 | ON | 2 | 100 |
| | 2 | ON | 2 | 200 |
| | 3 | ON | 1 | 400 |
| | 4 | OFF | UNDEFINED | UNDEFINED |
| | 5 | OFF | UNDEFINED | UNDEFINED |
| PV0005 | 1 | OFF | UNDEFINED | UNDEFINED |
| | 2 | OFF | UNDEFINED | UNDEFINED |
| | 3 | OFF | UNDEFINED | UNDEFINED |
| | 4 | OFF | UNDEFINED | UNDEFINED |
| | 5 | OFF | UNDEFINED | UNDEFINED |

FIG. 5

| PARAMETER | EXAMPLE |
|---|---|
| PV NAME OF MOVEMENT SOURCE | PV0004 |
| FIRST BLOCK POSITION WITHIN MOVEMENT SOURCE PV | 1 |
| PV NAME OF MOVEMENT DESTINATION | PV0005 |
| FIRST BLOCK POSITION WITHIN MOVEMENT DESTINATION PV | 1 |

FIG. 6

| MEDIA NAME | FIRST BLOCK POSITION | STORAGE POSITION INFORMATION | | |
|---|---|---|---|---|
| | | VALID FLAG | LUN# | LBA# |
| PV0004 | 1 | ON | 2 | 100 |
| | 2 | ON | 2 | 200 |
| | 3 | ON | 1 | 400 |
| | 4 | OFF | UNDEFINED | UNDEFINED |
| | 5 | OFF | UNDEFINED | UNDEFINED |
| PV0005 | 1 | OFF | UNDEFINED | UNDEFINED |
| | 2 | OFF | UNDEFINED | UNDEFINED |
| | 3 | OFF | UNDEFINED | UNDEFINED |
| | 4 | OFF | UNDEFINED | UNDEFINED |
| | 5 | OFF | UNDEFINED | UNDEFINED |

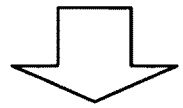

| MEDIA NAME | FIRST BLOCK POSITION | STORAGE POSITION INFORMATION | | |
|---|---|---|---|---|
| | | VALID FLAG | LUN# | LBA# |
| PV0004 | 1 | OFF | UNDEFINED | UNDEFINED |
| | 2 | ON | 2 | 200 |
| | 3 | ON | 1 | 400 |
| | 4 | OFF | UNDEFINED | UNDEFINED |
| | 5 | OFF | UNDEFINED | UNDEFINED |
| PV0005 | 1 | ON | 2 | 100 |
| | 2 | OFF | UNDEFINED | UNDEFINED |
| | 3 | OFF | UNDEFINED | UNDEFINED |
| | 4 | OFF | UNDEFINED | UNDEFINED |
| | 5 | OFF | UNDEFINED | UNDEFINED |

FIG. 7

| MEDIA NAME | FIRST BLOCK POSITION | STORAGE POSITION INFORMATION | | |
|---|---|---|---|---|
| | | VALID FLAG | LUN# | LBA# |
| PV0004 | 1 | ON | 2 | 100 |
| | 2 | ON | 2 | 200 |
| | 3 | ON | 1 | 400 |
| | 4 | OFF | UNDEFINED | UNDEFINED |
| | 5 | OFF | UNDEFINED | UNDEFINED |
| PV0005 | 1 | OFF | UNDEFINED | UNDEFINED |
| | 2 | OFF | UNDEFINED | UNDEFINED |
| | 3 | OFF | UNDEFINED | UNDEFINED |
| | 4 | OFF | UNDEFINED | UNDEFINED |
| | 5 | OFF | UNDEFINED | UNDEFINED |

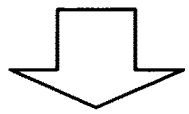

| MEDIA NAME | FIRST BLOCK POSITION | STORAGE POSITION INFORMATION | | |
|---|---|---|---|---|
| | | VALID FLAG | LUN# | LBA# |
| PV0004 | 1 | OFF | UNDEFINED | UNDEFINED |
| | 2 | OFF | UNDEFINED | UNDEFINED |
| | 3 | OFF | UNDEFINED | UNDEFINED |
| | 4 | OFF | UNDEFINED | UNDEFINED |
| | 5 | OFF | UNDEFINED | UNDEFINED |
| PV0005 | 1 | ON | 2 | 100 |
| | 2 | ON | 1 | 400 |
| | 3 | OFF | UNDEFINED | UNDEFINED |
| | 4 | OFF | UNDEFINED | UNDEFINED |
| | 5 | OFF | UNDEFINED | UNDEFINED |

| PV NAME (251a) | VALID LV NAME (251b) | FIRST BLOCK POSITION (251c) |
|---|---|---|
| PV0004 | LV0001 | 1 |
|  | LV0004 | 3 |
| PV0005 | - | - |

| PV NAME (251a) | VALID LV NAME (251b) | FIRST BLOCK POSITION (251c) |
|---|---|---|
| PV0004 | LV0004 | 3 |
| PV0005 | LV0001 | 1 |

FIG. 9

| FIRST BLOCK POSITION | | 1 | 2 | 3 | 4 | 5 |
|---|---|---|---|---|---|---|
| PV NAME | PV0004 | LV0001 | INVALID | LV0004 | FREE | FREE |
| | PV0005 | FREE | FREE | FREE | FREE | FREE |

252a   252b

| FIRST BLOCK POSITION | | 1 | 2 | 3 | 4 | 5 |
|---|---|---|---|---|---|---|
| PV NAME | PV0004 | INVALID | INVALID | LV0004 | FREE | FREE |
| | PV0005 | LV0001 | FREE | FREE | FREE | FREE |

252a   252b

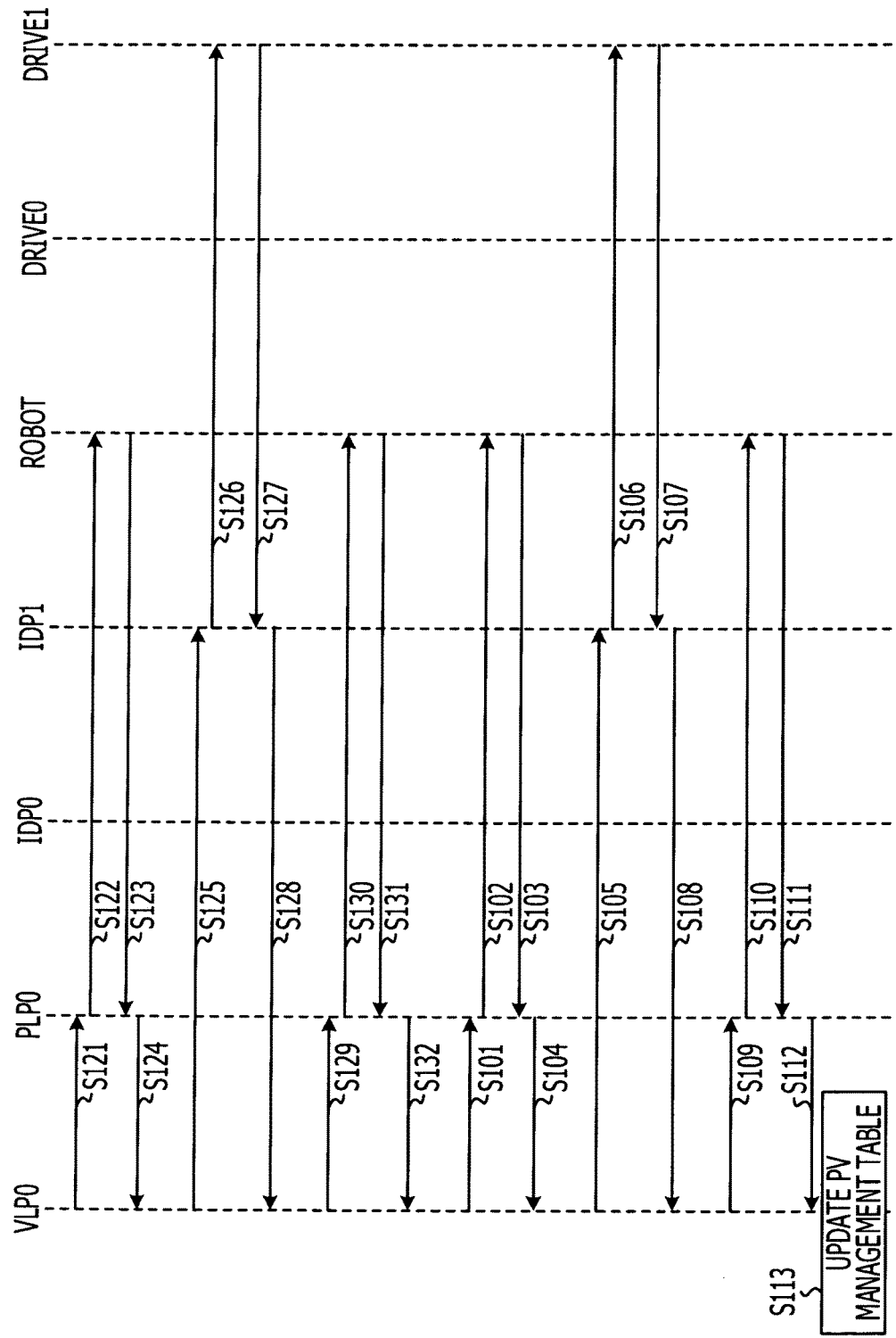

STORAGE DEVICE AND CONTROL METHOD

CROSS-REFERENCE TO RELATED APPLICATION

This application is based upon and claims the benefit of priority of the prior Japanese Patent Application No. 2013-084272, filed on Apr. 12, 2013, the entire contents of which are incorporated herein by reference.

FIELD

The embodiments discussed herein are related to a storage device and a control method.

BACKGROUND

A virtual tape device is a device which virtually performs a tape operation on a large-scale storage device, such as a hard disk and the like. Data of a tape image is arranged as logical volumes (LVs) on the large-scale storage device to eliminate operations of mounting, loading, and unloading a tape, which are performed by hardware, and increase the operation speed.

In a virtual tape device, a tape volume cache (TVC) is used to handle data as virtual volumes. As the TVC, for example, a redundant array of inexpensive disks (RAID) is used. Tape volumes accessed from an upper host device are stored in the TVC. This volume data is called LV data.

A data write operation performed by a virtual tape device will be described with reference to FIG. 13. FIG. 13 is a diagram illustrating a data write operation performed by a typical virtual tape device. As illustrated in FIG. 13, the virtual tape device includes virtual library processors (VLPs) VLP0 and VLP1, integrated channel processors (ICPs) ICP0 and ICP1, a physical library processor (PLP) PLP0, integrated device processors (IDPs) IDP0 and IDP1, and a NC. The VLPs control the entire virtual tape device. The ICPs are connected to a host device and control transmission of LV data stored in the TVC and reception of LV data to be stored in the NC. The function of a virtual drive is performed by the ICPs. The PLP controls a back-end tape library device. The IDPs control drives (DRIVE0 and DRIVE1) of the back-end tape library device.

The back-end tape library device connected to the virtual tape device includes a controller and a disk. The disk is a storage that actually stores data therein. Software for realizing similar functions to those of a robot, drives, and physical volumes (PVs) indicating media (physical tapes) is installed in the controller. That is, the tape library device is a device that emulates functions of the robot, the drives, and the PVs.

The virtual tape device stores LV data written by the host device in the TVC, and then, writes the LV data in PV (which is in fact a disk) of the tape library device. The processing of writing the LV data stored in the TVC into the PV is referred to as "migration".

In migration processing performed when LV data is updated due to a write operation of the LV data by the host device, the virtual tape device invalidates old data having been written in PV in the tape library device before the update. Then, the virtual tape device adds and writes new data at the end of the PV. When this operation is repeated, invalid areas are increased in the PV, and thus, free areas run out. Therefore, the virtual tape device changes the PV in which the free areas are running out to another PV to continue the write operation of the LV data. Thus, the use efficiency of PV is reduced, and reduction in the free capacity of the PV is caused.

In order to deal with such a situation, the virtual tape device takes out only valid LV data stored in a PV (referred to as a movement source PV), rearranges the took out LV data in another PV (referred to as a movement destination PV), and initializes the movement source PV. Rearranging the LV data stored in a PV is referred to as "reorganization". FIG. 14 is a diagram illustrating reorganization of a physical volume.

FIG. 14 illustrates PVs PV0003, PV0004, and PV0005, and LVs LV001, LV002, LV003, and LV004. As illustrated in FIG. 14, in the PV0003, when the LV002 is updated, data of the LV002 having been written in the PV0003 before the update is invalidated, and new data is added and written at the end of the PV0003. In the PV0004, when the LV001 is updated, data of the LV001 having been written in the PV0003 before the update is invalidated and new data is added and written in the PV0004. When the LV004 is updated, data of the LV004 having been written in the PV0004 before the update is invalidated and new data is added and written in the PV0004. Then, after reorganization, the LV data having been stored in each of the PV0003 and the PV0004 is rearranged in the PV0005, and the original PVs are initialized. Thus, fragmentation of the free areas in PVs is reduced, and the free capacity of PVs may be ensured.

There are two patterns of the operation of reorganization processing. A first pattern is an operation performed when LV data (referred to as target LV data) to be reorganized is on the TVC. In this case, the virtual tape device writes the target LV data on the NC into a PV in the tape library device, and then, updates a PV management table used for managing PVs.

FIG. 15 is a diagram illustrating a sequence of typical reorganization processing of a virtual tape device in the first pattern. As illustrated in FIG. 15, the VLP0 of the virtual tape device instructs the PLP0 to mount a movement destination PV in which the target LV data is reorganized (S101). The PLP0 controls a robot serving as a conveyance mechanism to mount the movement destination PV (S102). When the PLP0 receives a mount completion notice from the robot (S103), the PLP0 notifies the VLP0 of the completion of the mounting (S104). After the mounting is completed, the VLP0 instructs the IDP0 to write target LV data stored in the NC to the movement destination PV (S105). The IDP0 controls the DRIVE0 to execute a write operation (S106). When the IDP0 receives a write completion notice from the DRIVE0 (S107), the IDP0 notifies the VLP0 of the completion of the write operation (S108). Thus, valid target LV data stored in a PV is rearranged in another PV. Note that, in this case, an example in which the IDP0 is operated has been described, but another IDP may be operated. After the write operation to the movement destination PV is completed, the VLP0 instructs the PLP0 to demount the movement destination PV (S109). The PLP0 controls the robot to demount the movement destination PV (S110). When the PLP0 receives a demount completion notice from the robot (S111), the PLP0 notifies the VLP0 of the completion of the demounting (S112). After the demounting is completed, the VLP0 updates the PV management table so as to delete an identification name (referred to as an LV name) of an LV corresponding to the target LV data, which is stored in the PV management table in association with an identification name (referred to as a PV name) of the movement source PV (S113). Thus, reorganization processing is ended.

A second pattern of the operation of reorganization processing is an operation performed when the target LV data is not on the TVC. In this case, the virtual tape device reads the target LV data from the tape library device and stores the read target LV data in the TVC, and then, writes the target LV data stored in the TVC into a PV of the tape library device. Thereafter, the virtual tape device updates the PV management table.

FIG. 16 is a diagram illustrating a sequence of typical reorganization processing of a virtual tape device in the second pattern. As illustrated in FIG. 16, the VLP0 of the virtual tape device instructs the PLP0 to mount a movement source PV whose data is to be reorganized (S121). The PLP0 controls a robot to mount the movement source PV (S122). When the PLP0 receives a mount completion notice from the robot (S123), the PLP0 notifies the VLP0 of the completion of the mounting (S124). After the mounting is completed, the VLP0 instructs the IDP1 to read target LV data from the movement source PV (S125). The IDP1 controls the DRIVE1 to execute a read operation (S126). When the IDP1 receives a read completion notice from the DRIVEL (S127), the IDP1 notifies the VLP0 of the completion of the read operation (S128). Note that, in this case, an example in which the IDP1 is operated has been described, but another IDP may be operated. After the read operation from the movement source PV is completed, the VLP0 instructs the PLP0 to demount the movement source PV (S129). The PLP0 controls the robot to demount the movement source PV (S130). When the PLP0 receives a demount completion notice from the robot (S131), the PLP0 notifies the VLP0 of the completion of the demounting (S132). After the demounting is completed, the VLP0 executes the operation of reorganization processing that is to be performed when the target LV data is on the TVC (S101-S113). This processing is as illustrated in FIG. 15, and therefore, the description thereof will be omitted. Thus, reorganization processing is ended.

Related techniques are disclosed, for example, in Japanese Laid-open Patent Publication No. 2012-98965 and Japanese Laid-open Patent Publication No. 2007-323589.

However, typical reorganization processing has a problem in which the processing speed is reduced. That is, in reorganization processing, when the tape library device is a device that emulates a physical tape, the operations of mounting, demounting, and accessing PV are performed, and thus, the processing speed is reduced.

SUMMARY

According to an aspect of the present invention, provided is a storage device including a first storage and a processor. The processor is configured to emulate an access to a physical tape with an access to a second storage. The processor is configured to store, in the first storage, first position information in which a first position in a first physical tape is associated with a storage position in the second storage. The processor is configured to receive an instruction to move data stored at the first position in the first physical tape to a second physical tape. The processor is configured to store, in the first storage, second position information in which a second position in the second physical tape is associated with the storage position.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table illustrating an exemplary data structure of an LV storage state table;

FIG. 4 is a table illustrating an exemplary data structure of a media management table;

FIG. 5 is a table illustrating exemplary parameters of a reorganization start command;

FIG. 6 is a diagram illustrating an exemplary operation of a media management table;

FIG. 7 is a diagram illustrating, an exemplary operation of a media management table;

FIG. 9 is a diagram illustrating an exemplary operation of an LV storage state table;

FIG. 16 is a diagram illustrating a sequence of typical reorganization processing of a virtual tape device.

DESCRIPTION OF EMBODIMENTS

Hereinafter, embodiments of a storage device and a control method according to the present disclosure will be described in detail with reference to the accompanying drawings. Note that embodiments are not limited to the following embodiments. The embodiments may be combined as appropriate within a range that does not contradict the processing contents.

First Embodiment

Figure 1:
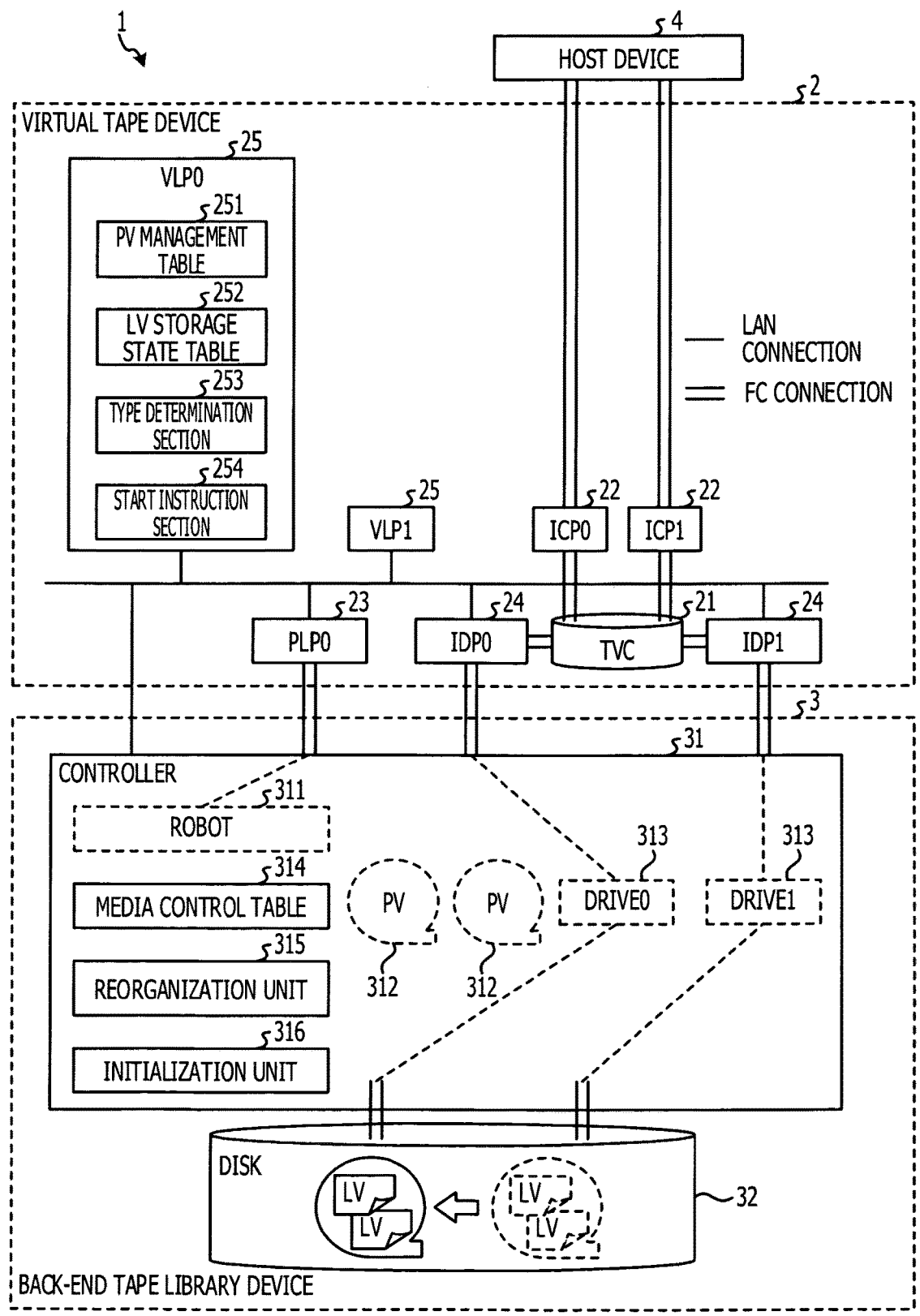
FIG. 1 is a diagram illustrating a hardware configuration of a storage device according to an embodiment.

FIG. 1 is a diagram illustrating a hardware configuration of a storage device according to a first embodiment. As illustrated in FIG. 1, a storage device 1 includes a virtual tape device 2 and a back-end tape library device 3. The virtual tape device 2 is a device that virtually performs an operation of a magnetic tape on a large-scale storage device, such as a hard disk and the like. Examples of the large-scale storage device include a TVC 21, which will be described later. The TVC 21 is used to handle data stored in the virtual tape device 2 as virtual volumes. The virtual tape device 2 is connected to the back-end tape library device 3. A part of the function of each of the virtual tape device 2 and the back-end tape library device 3 may be realized by using a computer. In that case, a processor provided in the computer executes a program and thereby realizes the part of the function.

There are different types of the back-end tape library device 3, that is, a type that uses an actual physical tape as a magnetic tape, and a type that uses, as a magnetic tape, an emulation tape obtained by emulating an actual physical tape by executing software. In the first embodiment, the type that uses an actual physical tape as a magnetic tape will be referred to as a "physical tape type", and the type that uses an emulation tape as a magnetic tape will be referred to as an "emulation type". Also, in the first embodiment, the back-end tape library device 3 is described as the "emulation type".

The virtual tape device 2 includes, the TVC 21, ICPs 22 (ICP0 and ICP1), a PLP 23 (PLP0), IDPs 24 (IDP0 and IDP1), and VLPs 25 (VLP0 and VLP1).

The TVC 21 is formed, for example, by a RAID device. Note that the NC 21 may be formed by a large-scale storage device, such as a solid state drive (SSD) and the like. The TVC 21 stores tape volumes accessed by an upper host device 4. Such volume data is LV data.

The ICPs 22 are connected to the host device 4 using a storage connection interface and control transmission of the LV data stored in the TVC 21 and reception of the LV data to be stored in the NC 21. Examples of the storage connection interface include, for example, Fibre Channel (FC) connection.

The PLP 23 and the IDPs 24 control the back-end tape library device 3. Note that, when the back-end tape library device 3 is of the physical tape type, the PLP 23 receives an instruction from the VLPs 25 and controls a robot 311 serving as a media conveyance mechanism in the back-end tape library device 3. When the back-end tape library device 3 is of the physical tape type, the IDPs 24 receive an instruction from the VLPs 25 and write the LV data stored in the NC 21 into media (PV) set in the drives 313 serving as tape drive units in the back-end tape library device 3.

The VLPs 25 control the entire virtual tape device 2. Note that, in the case where the back-end tape library device 3 is of the physical tape type, when the VLPs 25 receive a predetermined instruction, the VLPs 25 cause the PLP 23 or the IDPs 24 to perform processing corresponding to the instruction. The predetermined instruction is, for example, for mounting or demounting a PV or for reading or writing LV data.

Each VLP 25 includes a PV management table 251, an LV storage state table 252, a type determination section 253, and a start instruction section 254.

Figure 2:
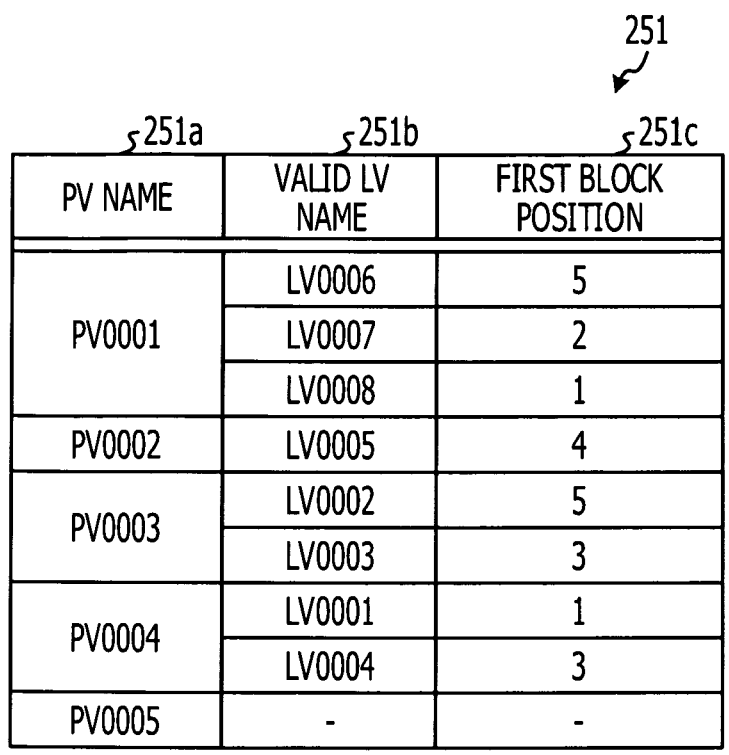
FIG. 2 is a table illustrating an exemplary data structure of a PV management table.

The PV management table 251 is used to manage the correspondence relationship between the LV data stored in the TVC 21 and PVs 312. A data structure of the PV management table 251 will be described below with reference to FIG. 2. FIG. 2 is a table illustrating an exemplary data structure of a PV management table. As illustrated in FIG. 2, the PV management table 251 stores a PV name 251a, a valid LV name 251b, and a first block position 251c in association with one another. The PV name 251a is the name of a PV. The valid LV name 251b is the name of a valid LV associated with the PV. The first block position 251c is the position within the PV at which a first block of the LV is associated. As an example, "LV0006" and "5" are set for the valid LV name 251b and the first block position 251c, respectively, in association with "PV0001" set for the PV name 251a. In a case where a VLP 25 is realized by using a computer, the PV management table 251 may be realized by using a storage provided in the computer.

The LV storage state table 252 is used to manage the storage state for the valid LVs in each PV 312. A data structure of the LV storage state table 252 will be described below with reference to FIG. 3. FIG. 3 is a table illustrating an exemplary data structure of an LV storage state table. As illustrated in FIG. 3, the LV storage state table 252 stores a PV name 252a and an LV storage state 252b corresponding to each first block position, in association with one another. The PV name 252a is the name of a PV. The LV storage state 252b is the storage state of an LV for each first block position within the PV represented by the PV name. For example, when an LV name is set in the LV storage state 252b, it is indicated that the storage state of an LV with the LV name is valid. When "invalid" is set in the LV storage state 252b, it is indicated that the storage state of the LV is invalid. As an example, "LV0001", "invalid", and "LV0004" are set for the first block positions "1", "2", and "3" of the LV storage state 252b, respectively, in association with "PV0004" set for the PV name 252a. In a case where a VLP 25 is realized by using a computer, the LV storage state 252b may be realized by using a storage provided in the computer.

The type determination section 253 determines the type of a back-end tape library device. For example, the type determination section 253 issues a command to inquire the type of a back-end tape library device to a controller 31, which will be described later. If there is a response to the command, the type determination section 253 determines that the back-end tape library device is of the emulation type. In such a case, the type determination section 253 causes the start instruction section 254 to issue a reorganization start command when reorganization is performed.

If there is no response to the command, the type determination section 253 determines that the back-end tape library device is of the physical tape type. In such a case, the type determination section 253 instructs, when reorganization is performed, the PLP 23 to mount or demount the PV, instructs the IDPs 24 to read or write the LV data, and thereby executes reorganization processing. In a case where a VLP 25 is realized by using a computer, the function of the type determination section 253 may be realized by a processor provided in the computer by executing a program.

The start instruction section 254 issues a reorganization start command to the controller 31, which will be described later. The reorganization start command includes movement source information and movement destination information for target LV data. The movement source information includes a PV name of a movement source PV of the target LV data and the first block position of the target LV data within the movement source PV. The movement destination information includes a PV name of a movement destination PV of the target LV data and a first block position within the movement destination PV at which the target LV data is to be moved.

When the start instruction section 254 receives a completion notice corresponding to the reorganization start command from the controller 31, the start instruction section 254 updates the PV management table 251 and the LV storage state table 252. For example, the start instruction section 254 deletes, from the PV management table 251, a record for the target LV data stored in the movement source PV, and adds a record for the target LV data stored in the movement destination PV to the PV management table 251. In the record for the target LV data stored in the movement destination PV, the PV name of the movement destination PV, the LV name of the target LV data, and the first block position within the movement destination PV at which the target LV data is to be moved are set as the PV name 251a, the valid LV name 251b, and the first block position 251c, respectively. The start instruction section 254 sets "invalid" in the LV storage state 252b for the first block position of the target LV data within the movement source PV. In addition, the start instruction section 254 sets the LV name of the target LV data in the LV storage state 252b for the first block position of the target LV data within the movement destination PV to indicate that the target LV data is valid. In a case where a VLP 25 is realized by using a computer, the function of the start instruction section 254 may be realized by a processor provided in the computer by executing a program.

The back-end tape library device 3 includes the controller 31 and a disk 32. The controller 31 includes the robot 311, PVs 312, the drives 313 (DRIVE) and DRIVE1), a media control table 314, a reorganization processing unit 315, and an initialization unit 316. The robot 311, the PVs 312, and the drives 313 are realized by executing software corresponding to respective functions. That is, the robot 311, the PVs 312, and the drives 313 emulate an access to an actual physical tape with an access to the disk 32 in which a storage area is allocated in place of the physical tape. The robot 311, the PVs 312, and the drives 313 are examples of an emulation section. In the case where the back-end tape library device 3 is of the physical tape type, the robot 311, the PVs 312, and the drives 313 are hardware having respective functions.

The disk 32 is a storage that actually stores LV data therein.

The media control table 314 stores the first block position of data within media and a data storage position within the disk 32 in association with one another for each media. The term "media" used herein refers to the PVs. A data structure of the media control table 314 will be described with reference to FIG. 4.

FIG. 4 is a table illustrating an exemplary data structure of a media management table. As illustrated in FIG. 4, the media control table 314 stores a media name 314a, a first block position 314b, and storage position information 314c in association with one another. The media name 314a is the name of media, that is, the name of a PV. The first block position 314b is a first block position within the PV. The storage position information 314c is information regarding a storage position within the disk 32 at which LV data is actually stored. The storage position information 314c includes a valid flag 314d, a logical unit number (LUN#) 314e, and a logical block address (LBA#) 314f.

The valid flag 314d is a valid flag indicating whether or not the storage position within a disk corresponding to the first block position within media is valid. For example, when the storage position is valid, "on" is set. When the storage position is invalid, "off" is set. Note that, when the valid flag 314d is valid, it is meant that the disk is not in an initialized state, that is, a state in which LV data has been stored in the disk as least once. When the valid flag 314d is invalid, it is meant that the disk is in an initialized state or a state in which the LV data is invalid. The state in which the LV data is invalid is determined by a reorganization processing unit 315, which will be described later, and "off" is set for the valid flag 314d.

The LUN#314e represents a logical unit number. LBA#314f represents a block address of a storage area, which has been logically given.

As an example, "1" is set for the first block position 314b, "on", "0", and "0" are set for the valid flag 314d, the LUN#314e, and the LBA#314f of the storage position information 314c, respectively, in association with "PV0001" set for the media name 314a. In a case where the controller 31 is realized by using a computer, the media control table 314 may be realized by using a storage provided in the computer.

When the reorganization processing unit 315 receives a reorganization start command, the reorganization processing unit 315 starts reorganization processing. For example, the reorganization processing unit 315 receives the reorganization start command from the VLP 25 of the virtual tape device 2. On the media control table 314, the reorganization processing unit 315 moves the target LV data from the first block position within the movement source PV to the first block position within the movement destination PV. That is, the reorganization processing unit 315 stores the storage position information 314c, which is associated in the media control table 314 with the first block position of the target LV data within the movement source media (PV), in association with the first block position of the target LV data within the movement destination media (PV). The reorganization processing unit 315 sets the valid flag 314d of the storage position information 314c, which corresponds to the movement source media (PV) of the target LV data, to "off" in the media control table 314. Thus, the reorganization processing unit 315 may rearrange valid LV data stored in a PV 312 to another PV 312 by operating the media control table 314.

If the valid flag 314d of the storage position information 314c associated with a first block position preceding the first block position of the target LV data within the movement source PV is valid, the reorganization processing unit 315 sets the valid flag 314d to invalid. That is, the reorganization processing unit 315 determines a state of the LV data stored at the storage position within the disk 32 corresponding to a first block position preceding the first block position of the target LV data within the movement source PV is invalid, and sets the valid flag 314d of the corresponding storage position information 314c to "off". Thus, the reorganization processing unit 315 may delete invalid LV data stored in a PV 312 by operating the media control table 314. For example, when LV data with an LV name of "LV004" stored in a PV with a PV name of "PV0004" is updated, the LV data of the LV004 having been written in PV0004 before the update is invalidated, and new data is added and written at the end of PV0004. Therefore, the reorganization processing unit 315 automatically sets the valid flag 314d corresponding to the first block position of the target LV data within the PV with a PV name of PV0004 before the update to "off". In a case where the controller 31 is realized by using a computer, the function of the reorganization processing unit 315 may be realized by a processor provided in the computer by executing a program.

When all of valid flags associated with the movement source PV are invalidated, the initialization unit 316 initializes the movement source PV. That is, the initialization unit 316 executes scratch processing for the movement source PV, for example. The scratch processing corresponds to initialization of directory information. For example, when all of the valid flags 314d of the storage position information 314c associated with the movement source PV are "off", the initialization unit 316 puts the movement source PV in an initialized state. Thus, the initialization unit 316 may automatically initialize a PV for which rearrangement of LV data is completed in reorganization processing. In a case where the controller 31 is realized by using a computer, the function of the initialization unit 316 may be realized by a processor provided in the computer by executing a program.

Next, exemplary parameters of a reorganization start command will be described with reference to FIG. 5. FIG. 5 is a table illustrating exemplary parameters of a reorganization start command. As illustrated in FIG. 5, the reorganization start command may include a plurality of parameters. Exemplary parameters relating to the movement source information include a PV name of the movement source PV of the target LV data and a first block position of the LV data within the movement source PV. Exemplary parameters relating to the movement destination information include a PV name of the movement destination PV of target LV data and a first block position within the movement destination PV at which the target LV data is to be moved. As an example, "PV0004" and "1" are set as the PV name of the movement source PV and the first block position of the target LV data within the movement source PV, respectively. "PV0005" and "1" are set as the PV name of the movement destination PV and the first block position within the movement destination PV at which the target LV data is to be moved, respectively. Upon receiving a reorganization start command including these parameters, the reorganization processing unit 315 moves the target LV data from the first block position "1" within a movement source PV with the PV name "PV0004" to the first block position "1" within a movement destination PV with the PV name "PV0005".

Next, a specific example of the operation of the media control table 314 in the back-end tape library device 3 will be described with reference to FIG. 6 and FIG. 7. Each of FIG. 6 and FIG. 7 is a diagram illustrating an exemplary operation of a media management table. FIG. 6 illustrates an exemplary operation performed when a reorganization start command to move LV data stored at the first block position "1" within the movement source PV with the PV name "PV0004" to the first block position "1" within the movement destination PV with the PV name "PV0005" is received. FIG. 7 illustrates, in addition to the example of FIG. 6, an exemplary operation performed when a reorganization start command to move LV data stored at the first block position "3" within the movement source PV with the PV name "PV0004" to the first block position "2" within the movement destination PV with the PV name "PV0005" is received.

As illustrated in the upper table of FIG. 6, before an operation of the media control table 314 is executed, information set in the storage position information 314c in association with "PV0004" set for the media name 314a of the movement source PV and "1" set for the first block position 314b is as follows. The valid flag 314d, the LUN#314e, and the LBA#314f are set to "on", "2", and "100", respectively. On the other hand, information set in the storage position information 314c in association with "PV0005" set for the media name 314a of the movement destination PV and "1" set for the first block position 314b is as follows. The valid flag 314d is set to "off". The LUN#314e and the LBA#314f are undefined.

In the above-described situation, the reorganization processing unit 315 stores the storage position within the disk 32, which corresponds to the first block position within the movement source PV, in the media control table 314 in association with the first block position within the movement destination PV. The reorganization processing unit 315 sets the valid flag 314d of the storage position information 314c, which corresponds to the movement source PV, to "off".

As illustrated in a lower table in FIG. 6, after the operation of the media control table 314 is executed, information set in the storage position information 314c in association with "PV0004" set for the media name 314a of the movement source PV and "1" set for the first block position 314b is as follows. The valid flag 314d is "off", and the LUN#314e and the LBA#314f are undefined. On the other hand, information set in the storage position information 314c in association with "PV0005" set for the media name 314a of the movement destination PV and "1" set for the first block position 314b is as follows. The valid flag 314d, the LUN#314e, and the LBA#314f are set to "on", "2", and "100", respectively.

Thus, the reorganization processing unit 315 may rearrange valid LV data stored in a PV 312 to another PV 312 by operating the media control table 314.

As illustrated in an upper table in FIG. 7, before an operation of the media control table 314 is executed, information set in the storage position information 314c in association with "PV0004" set for the media name 314a of the movement source PV and "1" set for the first block position 314b is as follows. The valid flag 314d, the LUN#314e, and the LBA#314f are set to "on", "2", and "100", respectively. Information set in the storage position information 314c in association with "PV0004" set for the media name 314a of the movement source PV and "3" set for the first block position 314b is as follows. The valid flag 314d, the LUN#314e, and the LBA#314f are set to "on", "1", and "400", respectively.

On the other hand, information set in the storage position information 314c in association with "PV0005" set for the media name 314a of the movement destination PV and "1" set for the first block position 314b is as follows. The valid flag 314d is set to "off". The LUN#314e and the LBA#314f are undefined. Information set in the storage position information 314c in association with "PV0005" set for the media name 314a of the movement destination PV and "2" set for the first block position 314b is as follows. The valid flag 314d is set to "off". The LUN#314e and the LBA#314f are undefined.

In the above-described situation, the reorganization processing unit 315 stores the storage position within the disk 32, which corresponds to the first block position within the movement source PV, in the media control table 314 in association with the first block position within the movement destination PV. The reorganization processing unit 315 sets the valid flag 314d to "off" in the storage position information 314c that corresponds to the movement source PV.

As illustrated in a lower table in FIG. 7, after the operation of the media control table 314 is executed, information set in the storage position information 314c in association with "PV0004" set for the media name 314a of the movement source PV and "1" set for the first block position 314b is as follows. The valid flag 314d is "off", and the LUN#314e and the LBA#314f are undefined. On the other hand, information set in the storage position information 314c in association with "PV0005" set for the media name 314a of the movement destination PV and "1" set for the first block position 314b is as follows. The valid flag 314d, the LUN#314e, and the LBA#314f are set to "on", "2", and "100", respectively.

In addition, after the operation of the media control table 314 is executed, information set in the storage position information 314c in association with "PV0004" set for the media name 314a of the movement source PV and "3" set for the first block position 314b is as follows. The valid flag 314d is "off", and the LUN#314e and the LBA#314f are undefined. On the other hand, information set in the storage position information 314c in association with "PV0005" set for the media name 314a of the movement destination PV and "2" set for the first block position 314b is as follows. The valid flag 314d, the LUN#314e, and the LBA#314f are set to "on", "1", and "400", respectively.

Furthermore, when the valid flag 314d is valid in the storage position information 314c, which is associated with a first block position preceding the first block position within the movement source PV, the reorganization processing unit 315 sets the valid flag 314d to "off". That is, the reorganization processing unit 315 determines that the state of LV data is invalid for LV data stored at a first block position preceding the first block position of the target LV data within the movement source PV.

As illustrated in the upper table in FIG. 7, before the operation of the media control table 314 is executed, "on" is set for the valid flag 314d of the storage position information 314c, in association with "2" set for the first block position 314b, which precedes "3" set for the first block position 314b within the movement source PV with the media name 314a of "PV0004". Therefore, the reorganization processing unit 315 sets the valid flag 314d to "off". As illustrated in the lower table in FIG. 7, after the operation of the media control table 314 is executed, information set in the storage position information 314c in association with "PV0004" set for the media name 314a of the movement destination PV and "2" set for the first block position 314b is as follows. The valid flag 314d is set to "off". The LUN#314e and the LBA#314f are undefined.

Thus, the reorganization processing unit 315 may delete invalid LV data stored in a PV 312 by operating the media control table 314.

Figure 8:
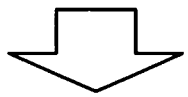
FIG. 8 is a diagram illustrating an exemplary operation of a PV management table.

Next, a specific example of the operation of the PV management table 251 and the LV storage state table 252 performed in the virtual tape device 2 will be described with reference to FIG. 8 and FIG. 9. FIG. 8 is a diagram illustrating an exemplary operation of a PV management table. FIG. 9 is a diagram illustrating an exemplary operation of an LV storage state table. Each of FIG. 8 and FIG. 9 illustrates an operation performed when the start instruction section 254 issues a reorganization start command and receives a completion notice. The reorganization start command is an instruction to move the LV data "LV0001" stored at the first block position "1" within the movement source PV with the PV name "PV0004" to the first block position "1" within the movement destination PV with the PV name "PV0005".

As illustrated in an upper table in FIG. 8, before an operation of the PV management table 251 is performed, "LV0001" is set for the valid LV name 251b in association with "PV0004" set for the PV name 251a and "1" set for the first block position 251c.

In the above-described situation, when the start instruction section 254 receives a completion notice from the controller 31, the start instruction section 254 deletes a record of the movement source PV corresponding to the target LV data from the PV management table 251 and adds a record of the movement destination PV corresponding to the LV data to the PV management table 251. As illustrated in a lower table in FIG. 8, after the operation of the PV management table 251 is performed, a record corresponding to "LV0001" set for the valid LV name 251b and "PV0004" set for the PV name 251a has been deleted. "LV0001" is set for the valid LV name 251b in association with "PV0005" set for the PV name 251a and "1" set for the first block position 251c.

As illustrated in an upper table in FIG. 9, before an operation of the LV storage state table 252 is performed, "LV0001" is set for the first block position "1" in the LV storage state 252b in association with "PV0004" set for the PV name 252a.

In the above-described situation, the start instruction section 254 sets "invalid" for the first block position within the movement source PV of the target LV data in the LV storage state 252b of the LV storage state table 252. In addition, the start instruction section 254 sets the LV name of the LV data in the LV storage state 252b for a block position of the LV data within the movement destination PV to indicate that the LV data is valid. As illustrated in a lower table in FIG. 9, after the operation of the LV storage state table 252 is executed, "invalid" is set for the first block position "1" in the LV storage state 252b in association with "PV0004" set for the PV name 252a. "LV0001" is set for the first block position "1" in the LV storage state 252b in association with "PV0005" set for the PV name 252a.

Figure 10:
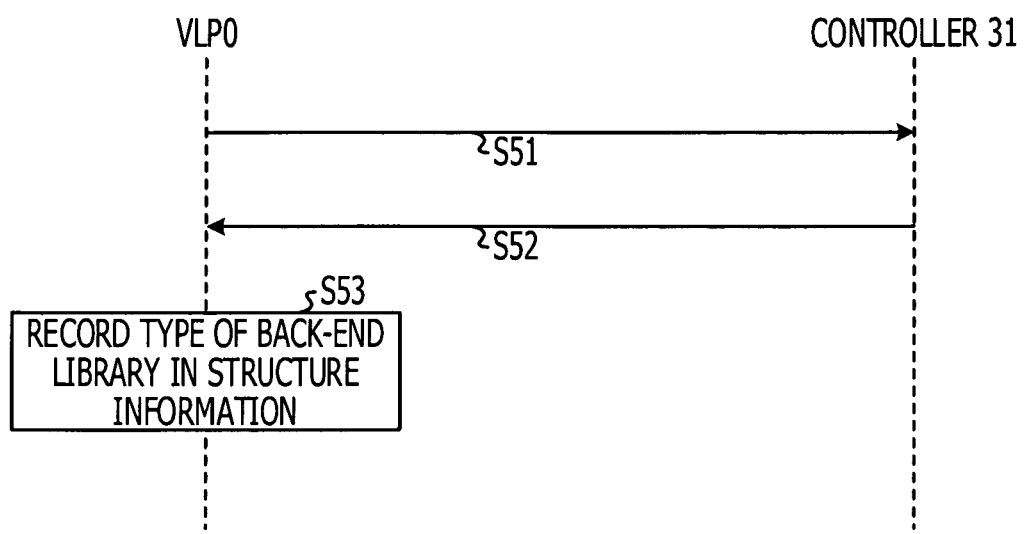
FIG. 10 is a diagram illustrating a sequence of type-inquiry processing.

Next, a sequence of type-inquiry processing will be described with reference to FIG. 10. FIG. 10 is a diagram illustrating a sequence of type-inquiry processing. As illustrated in FIG. 10, the VLP0 issues, to the controller 31, a command to inquire the type of the back-end tape library device 3 (S51).

Then, the controller 31 which has received the command to inquire the type of the back-end tape library device 3 returns an ACK response to the command sent from the VLP0 (S52). The VLP0 which has received the ACK response records structure information indicating that the type of the back-end tape library device 3 is the "emulation type" (S53).

When there is no response from the controller 31, the VLP0 determines that the type of the back-end tape library device 3 is not the "emulation type".

Figure 11:
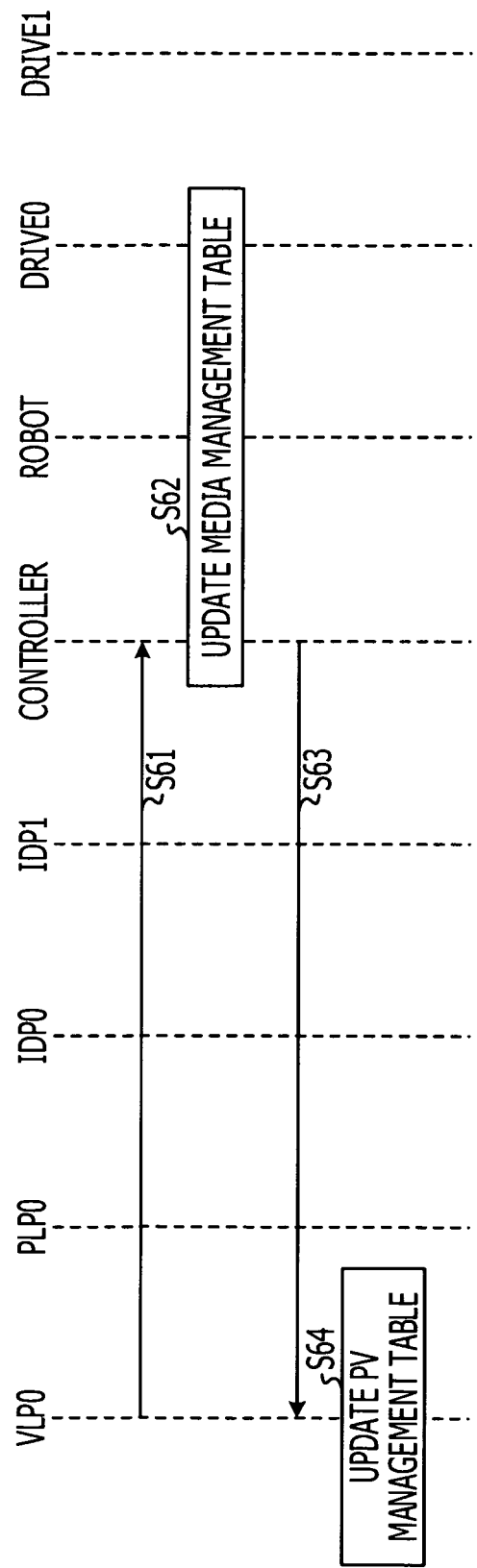
FIG. 11 is a diagram illustrating a sequence of start instruction processing.

Next, a sequence of start instruction processing will be described with reference to FIG. 11. FIG. 11 is a diagram illustrating a sequence of start instruction processing. As illustrated in FIG. 11, the VLP0 issues a reorganization start command to the controller 31 (S61).

Then, the controller 31 which has received the reorganization start command updates the media control table 314 in accordance with the reorganization start command (S62). That is, the reorganization processing unit 315 of the controller 31 executes reorganization processing.

The controller 31 notifies the VLP0 of the completion of reorganization (S63). Then, the VLP0 updates the PV management table 251 in accordance with the completion notice (S64).

Figure 12A:
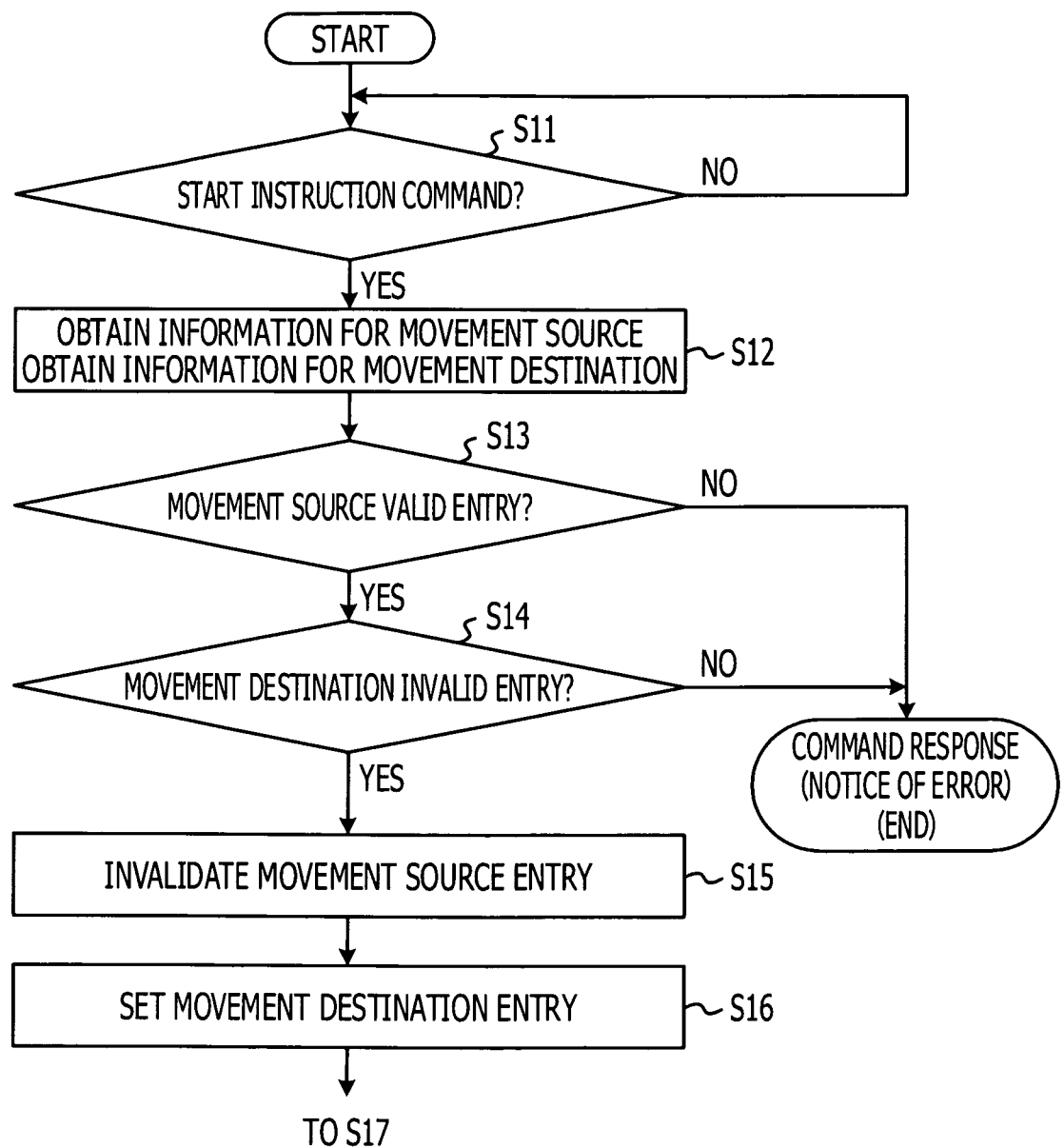
FIG. 12A is a flowchart of reorganization processing.
Figure 12B:
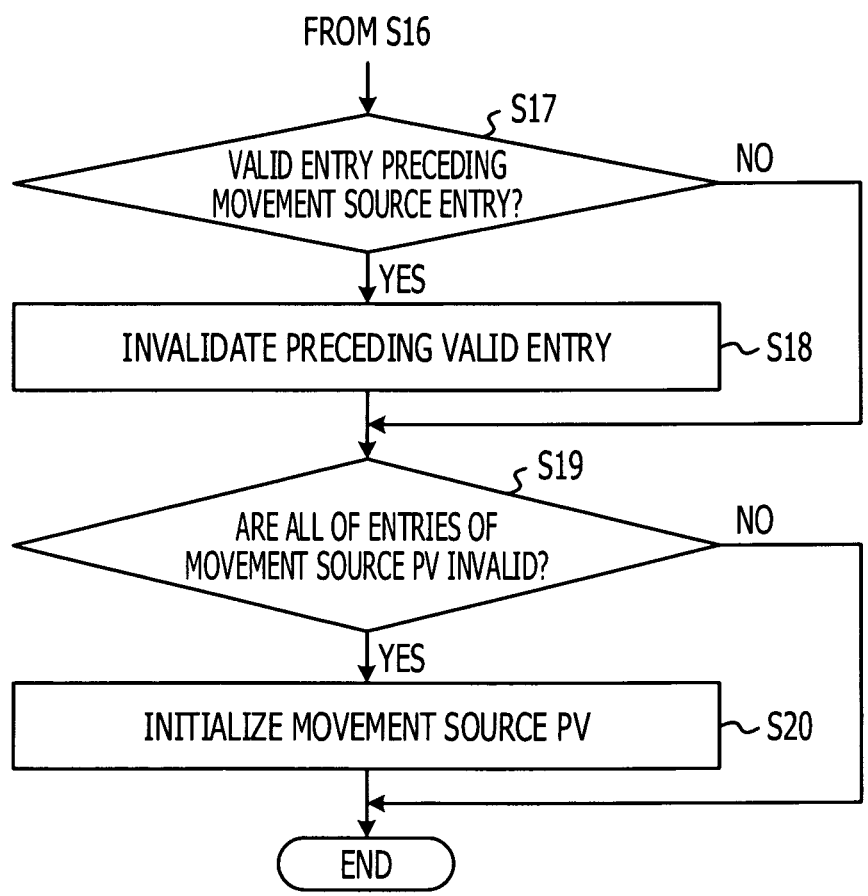
FIG. 12B is a flowchart of reorganization processing.
Figure 13:
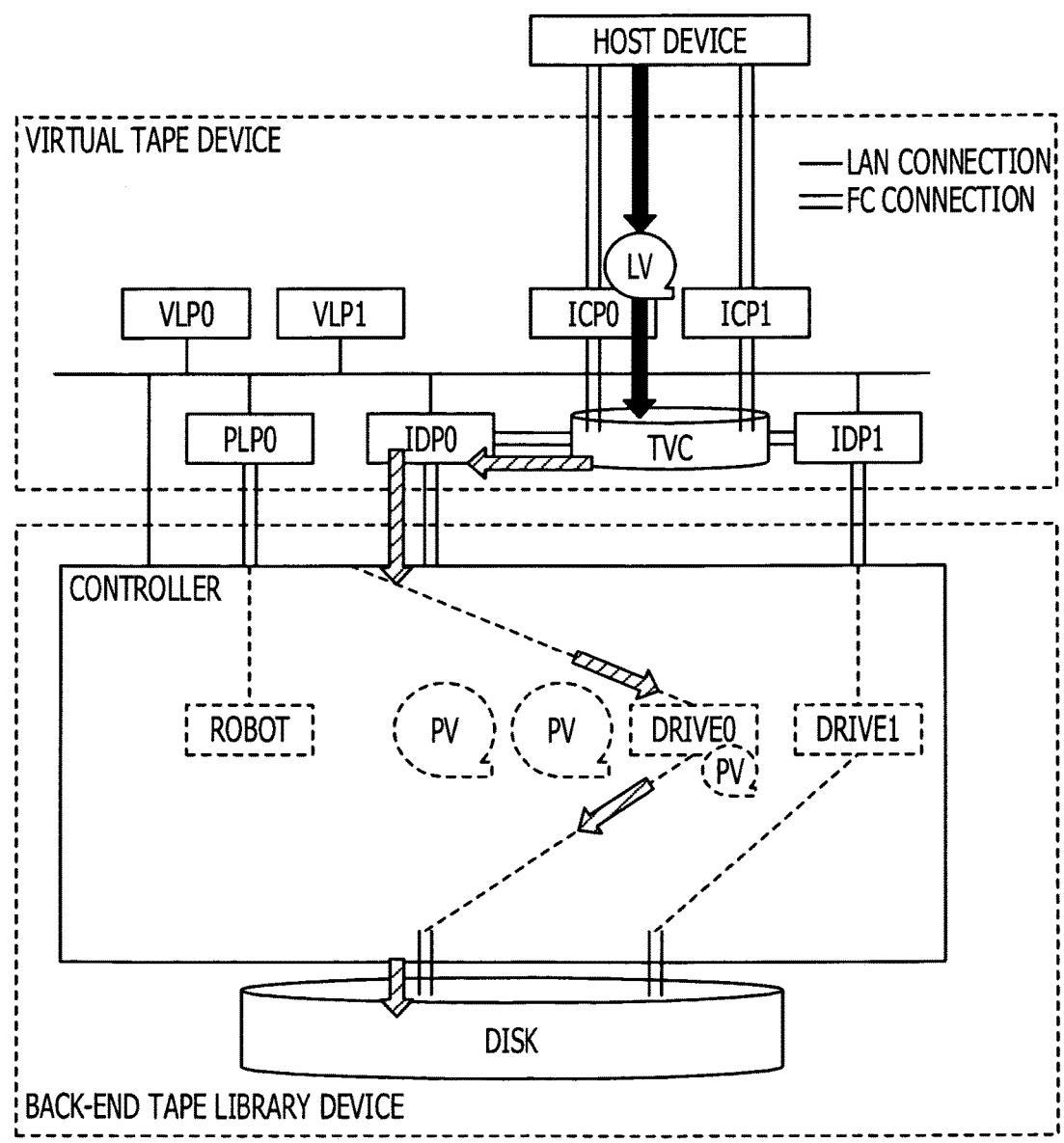
FIG. 13 is a diagram illustrating a data write operation performed by a typical virtual tape device.
Figure 14:
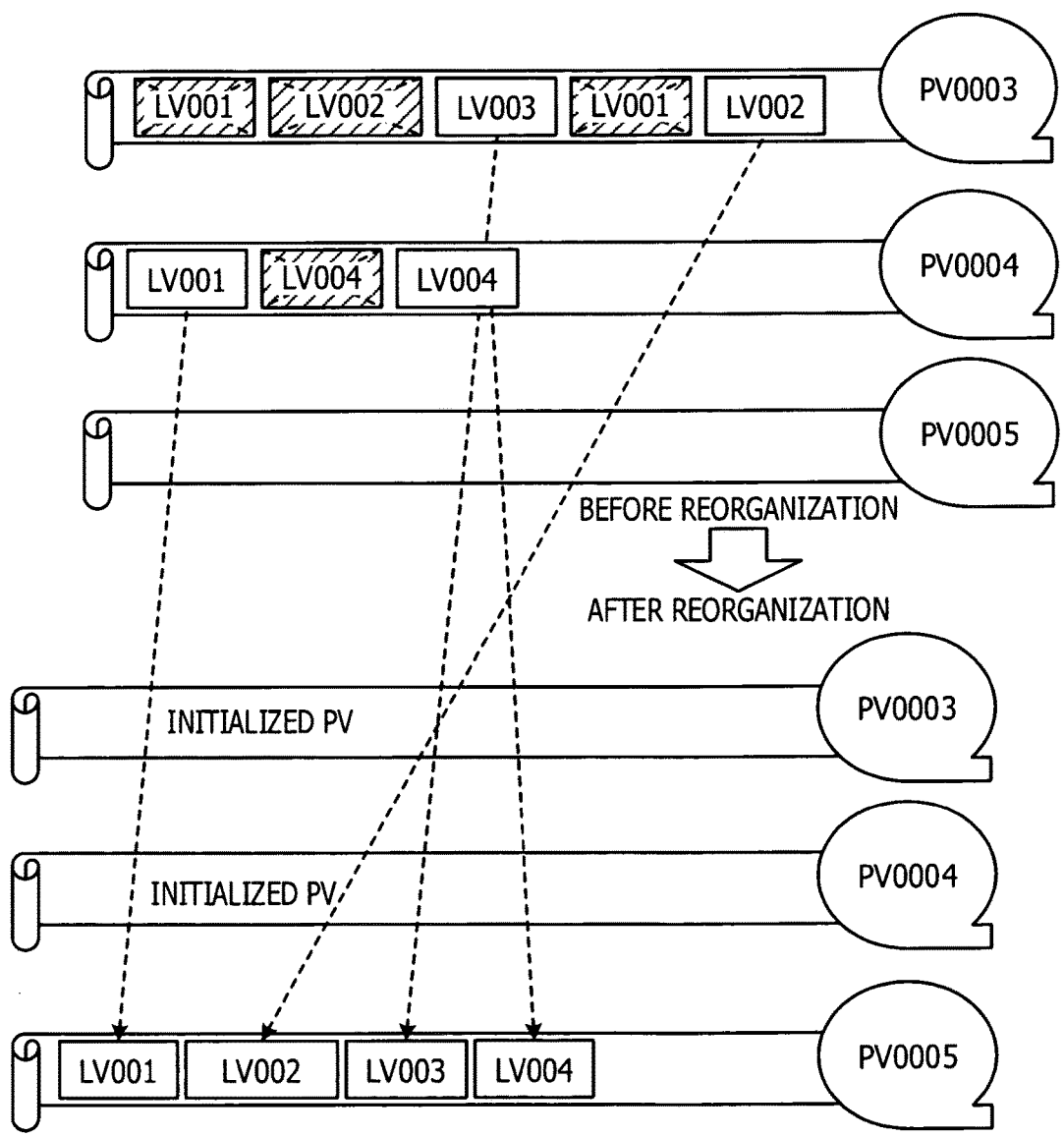
FIG. 14 is a diagram illustrating reorganization of a physical volume.
Figure 15:
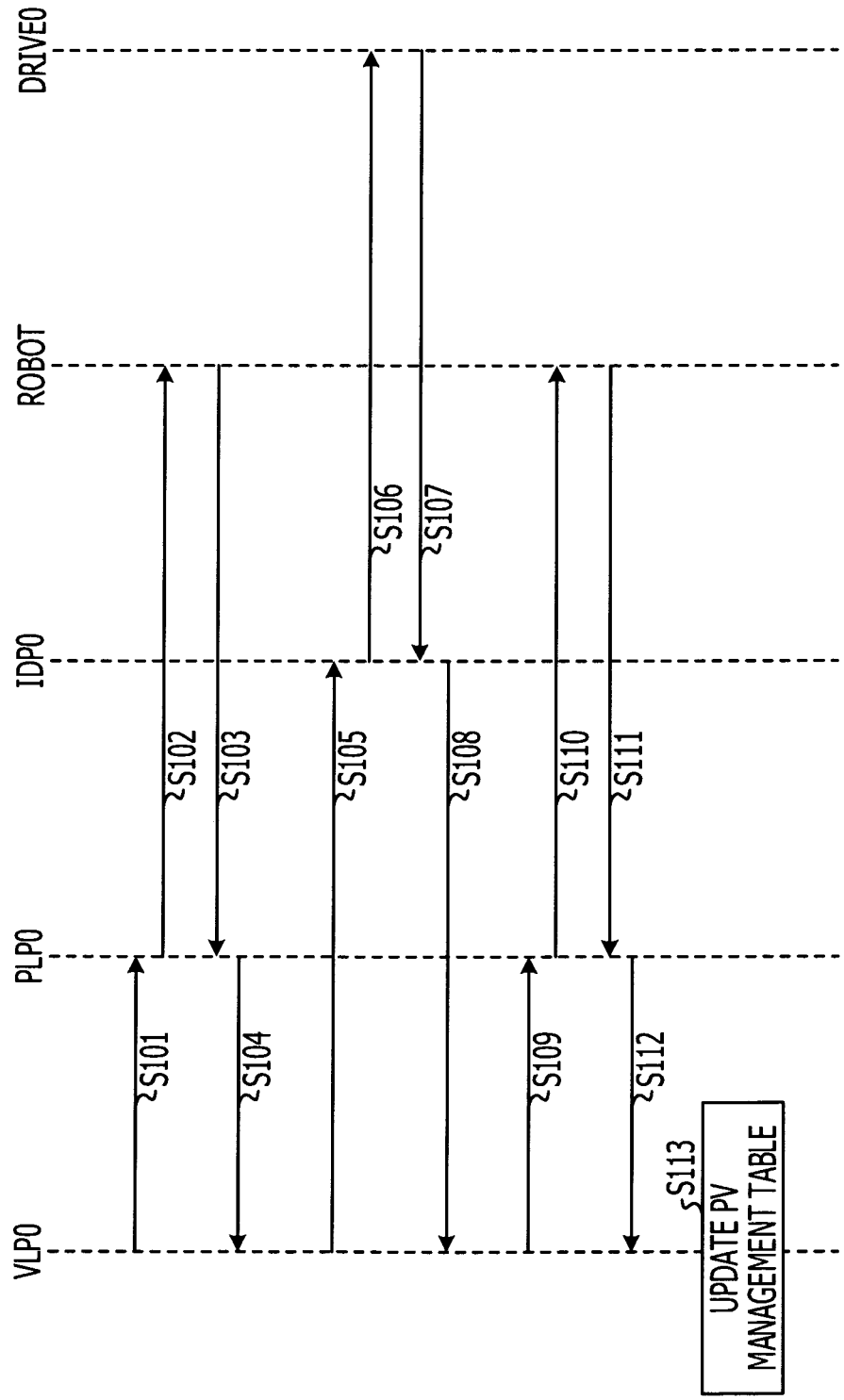
FIG. 15 is a diagram illustrating a sequence of typical reorganization processing of a virtual tape device.

Next, procedures of reorganization processing will be described with reference to FIGS. 12A and 12B. Each of FIGS. 12A and 12B is a flowchart of reorganization processing.

First, the reorganization processing unit 315 determines whether or not a reorganization start command has been received (S11). If the reorganization processing unit 315 determines that a reorganization start command has not been received (NO in S11), the reorganization processing unit 315 repeats determination processing until a reorganization start command is received.

On the other hand, if the reorganization processing unit 315 determines that a reorganization start command has been received (YES in S11), the reorganization processing unit 315 obtains, from the reorganization start command, movement source information and movement destination information for the target LV data (S12). The movement source information includes a PV name (referred to as a "movement source PV name") of a movement source PV of target LV data and a first block position (referred to as a "movement source LV position") of the LV data within the movement source PV. The movement destination information includes a PV name (referred to as a "movement destination PV name") of a movement destination PV of target LV data and a first block position (referred to as a "movement destination LV position") of the LV data within the movement destination PV.

Subsequently, the reorganization processing unit 315 determines whether or not the media control table 314 contains an entry including the "movement source PV name" and the "movement source LV position" specified by the reorganization start command and whether or not a valid flag 314d for the entry is set to "on" (S13). If the media control table 314 does not contain the entry including the "movement source PV name" and the "movement source LV position" or if the valid flag 314d for the entry is not set to "on" (NO in S13), the reorganization processing unit 315 sends a notice of an error as a response.

On the other hand, if the media control table 314 contains the entry including the "movement source PV name" and the "movement source LV position" and if the valid flag 314d for the entry is set to "on" (YES in S13), the process of the reorganization processing unit 315 proceeds to the following determination processing. That is, the reorganization processing unit 315 determines whether or not the media control table 314 contains an entry including the "movement destination PV name" and the "movement destination LV position" specified by the reorganization start command and whether or not the valid flag 314d for the entry is set to "off" (S14). If the media control table 314 does not contain the entry including the "movement destination PV name" and the "movement destination LV position" or if the valid flag 314d for the entry is not set to "off" (NO in S14), the reorganization processing unit 315 sends a notice of an error as a response.

On the other hand, if the media control table 314 contains the entry including the "movement destination PV name" and the "movement destination LV position" and if the valid flag 314d for the entry is set to "off" (YES in S14), the process of the reorganization processing unit 315 proceeds to S15. The reorganization processing unit 315 updates the valid flag 314d of the storage position information 314c to "off" for the entry including the "movement source PV name" and the "movement source LV position" of the target LV data (S15). Thus, values of the LUN#314e and the LBA#314f of the entry for which the valid flag 314d has been updated to "off" are treated as invalid (undefined).

The reorganization processing unit 315 updates the valid flag 314d of the storage position information 314c to "on" for the entry including the "movement destination PV name" and the "movement destination LV position" for the target LV data. Then, the reorganization processing unit 315 writes, to the LUN#314e and the LBA#314f of the entry, values of the LUN#314e and the LBA#314f of the entry for which the valid flag 314d has been updated to "off" (S16). Thus, the values of the LUN#314e and the LBA#314f of the entry for which the valid flag 314d has been updated to "on" are treated as valid.

Subsequently, the reorganization processing unit 315 determines whether or not the media control table 314 contains an entry including the valid flag 314d set to "on" and the first block position 314b that precedes the "movement source LV position" specified by the reorganization start command (S17). If the reorganization processing unit 315 determines that the media control table 314 contains the entry including the valid flag 314d set to "on" and the first block position 314b that precedes the "movement source LV position" (YES in S17), the reorganization processing unit 315 executes the following processing. That is, the reorganization processing unit 315 updates the valid flag 314d of the entry to "off" (S18). Thereafter, the process of the reorganization processing unit 315 proceeds to S19.

On the other hand, if the reorganization processing unit 315 determines that the media control table 314 does not contain the entry including the valid flag 314d set to "on" and the first block position 314b that precedes the "movement source LV position" (NO in S17), the process of the reorganization processing unit 315 proceeds to S19. The initialization unit 316 determines whether or not the valid flags 314d are "off" for all entries including the "movement source PV name" specified by the reorganization start command (S19). If the reorganization processing unit 315 determines that there is one or more entries including "movement source PV name" and the valid flag 314d which is not "off" (NO in S19), the reorganization processing is ended.

On the other hand, if the reorganization processing unit 315 determines that the valid flags 314d are "off" for all entries including the "movement source PV name" (YES in S19), the initialization unit 316 executes initialization of media (PV) with the "movement source PV name" (S20). For example, the initialization unit 316 executes initialization of directory information. Then, the reorganization processing is ended.

According to the first embodiment, the storage device 1 stores LV data in the disk 32 such that the LV data is stored in an emulated PV 312. When the storage device 1 receives a reorganization start instruction to move target LV data stored in a movement source PV to a movement destination PV, the storage device 1 executes reorganization processing. The storage device 1 stores the storage position information 314c of the target LV data stored in the media control table 314 in association with the first block position within the movement source PV, in association with the first block position within the movement destination PV. In the above-described configuration, when the storage device 1 receives the reorganization start instruction, the storage device 1 performs reorganization processing by operating the media control table 314, and therefore, the processing speed of reorganization processing may be increased. That is, the storage device 1 does not perform operations for a PV, such as mounting a PV, demounting a PV, writing LV data to a PV, reading LV data from a PV, and the like, therefore, the processing speed of reorganization processing may be increased.

According to the first embodiment, the storage device 1 sets the valid flag 314d, which is associated with the first block position of the target LV data within the movement source PV, to invalid. Then, if the valid flag 314d associated with a first block position preceding the "movement source LV position" within the movement source PV is valid, the storage device 1 sets the valid flag 314d to invalid. In the above-described configuration, the storage device 1 may delete invalid LV data stored in PV 312 by operating the media control table 314. As a result, the storage device 1 may automatically match validity of a first block position within PV viewed from the VLP 25 and validity of a storage position within a disk 32 viewed from the controller 31 with each other.

According to the first embodiment, when all of valid flags 314d associated with movement source PV are invalid, the storage device 1 initializes the movement source PV. In the above-described configuration, the storage device 1 may automatically initialize a PV for which rearrangement of LV data is completed in reorganization processing and may efficiently initialize a PV without determination of a superior device.

OTHER EMBODIMENTS

The start instruction section 254 issues a reorganization start command to the controller 31. The reorganization start command is configured to include, for example, movement source information and movement destination information for a single piece of target LV data. However, the reorganization start command is not limited thereto, but may be configured to collectively include movement source information and movement destination information for a plurality of pieces of target LV data. In this case, the reorganization processing unit 315 may repeat reorganization processing as many times as the number of pieces of target LV data included in the reorganization start command. The initialization unit 316 may perform initialization processing after processing of the reorganization processing unit 315 is performed. In the above-described configuration, the reorganization processing unit 315 may further increase the processing speed of reorganization processing.

When the back-end tape library device 3 is of the "emulation type" and performs write and read operations, the controller 31 executes, in performing reorganization processing, for example, a function of deduplicating LV data. The function of deduplicating LV data corresponds to a compression function of reducing data used for storing LV data. In this case, the controller 31 performs, in addition to write and read operations, an operation of firmware, such as the function of deduplicating LV data and the like, in performing reorganization processing, and such operations affect the processing speed of reorganization processing. However, according to the first embodiment, even when the back-end tape library device 3 is of the "emulation type", the storage device 1 does not perform write and read operations in performing reorganization processing, and thus, does not perform an operation of firmware, such as the function of deduplicating LV data and the like, either. Therefore, because the storage device 1 does not perform an operation of firmware, such as the function of deduplicating LV data and the like, the processing time of reorganization processing may be reduced.

Each element of the storage device 1 illustrated in the accompanying drawings may be configured in a physically different manner from the manner illustrated in the accompanying drawings. That is, a specific disintegration and integration of the storage device 1 is not limited to the illustrated modes, and all or a part thereof may be configured by functionally or physically applying disintegration and integration in a given unit in accordance with load of various kinds, a status of use, and the like. For example, the type determination section 253 and the start instruction section 254 may be integrated as a single unit. The reorganization processing unit 315 may be deintegrated into a reception section that receives a reorganization start command and an execution section that executes reorganization processing. Also, the reorganization processing unit 315 may be deintegrated into a movement section that realizes movement of LV data between PVs and an update section that updates the value of the valid flag 314*d*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
   a first storage volume that includes a first physical tape and a second physical tape; and
   a processor configured to
      store, in the first storage volume, first position information at a first position in the first physical tape, the first position being a storage position at which first data is stored in the first physical tape,
      receive an instruction to move the first data from the first physical tape to the second physical tape,
      store, in the first storage volume, second position information at a second position in the second physical tape, the second position being a position at which the first data is stored in the second physical tape, a first validity flag being associated with the first position, the first validity flag indicating whether the storage position is valid,
      set, after storing the second position information, the first validity flag to indicate that the first data in the first position is invalid,
      identify a third position that precedes the first position, and
      set a second validity flag to indicate that second data in the third position is invalid.

2. The storage device according to claim 1, wherein the processor is configured to initialize the first physical tape when all of validity flags each associated with a position in the first physical tape indicate invalid.

3. A non-transitory computer-readable recording medium having stored therein a program for causing a computer to execute a process, the computer including a first storage volume, the process comprising:
   storing, in the first storage volume, first position information at a first position in a first physical tape, the first position being a storage position at which first data is stored in the first physical tape;
   receiving an instruction to move the first data from the first physical tape to a second physical tape;
   storing, in the first storage volume, second position information at a second position in the second physical tape, the second position being a position at which the first data is to be stored in the second physical tape, a first validity flag being associated with the first position, the first validity flag indicating whether the storage position is valid,
   setting, after storing the second position information, the first validity flag to indicate that the first data in the first position is invalid,
   identifying a third position that precedes the first position, and
   setting a second validity flag to indicate that second data in the third position is invalid.

4. A control method comprising:
   storing, in a first storage volume, first position information at a first position in a first physical tape, the first position being a storage position at which first data is stored in the first physical tape;

receiving an instruction to move the first data from the first physical tape to a second physical tape;

storing, in the first storage volume, second position information at a second position in the second physical tape, the second position being a position at which the first data is to be stored in the second physical tape, a first validity flag being associated with the first position, the first validity flag indicating whether the storage position is valid, setting, after storing the second position information, the first validity flag to indicate that the first data in the first position is invalid, identifying a third position that precedes the first position, and setting a second validity flag to indicate that second data in the third position is invalid.

\* \* \* \* \*